United States Patent
Chen et al.

(10) Patent No.: US 10,536,535 B2
(45) Date of Patent: Jan. 14, 2020

(54) MANAGEMENT SYSTEM FOR INTERNET PROTOCOL ADDRESS OF BASEBOARD MANAGEMENT CONTROLLER, MANAGEMENT TERMINAL, AND MANAGEMENT METHOD

(71) Applicant: HONGFUJIN PRECISION ELECTRONICS (TIANJIN) CO., LTD., Tianjin (CN)

(72) Inventors: Po-Jung Chen, New Taipei (TW); Jiing-Shyang Jang, New Taipei (TW)

(73) Assignee: HONGFUJIN PRECISION ELECTRONICS(TIANJIN)CO.,LTD., Tianjin (CN)

( * ) Notice: Subject to any disclaimer, the term of this patent is extended or adjusted under 35 U.S.C. 154(b) by 471 days.

(21) Appl. No.: 15/367,113

(22) Filed: Dec. 1, 2016

(65) Prior Publication Data
US 2018/0159942 A1 Jun. 7, 2018

(51) Int. Cl.
H04L 29/08 (2006.01)
H04L 29/12 (2006.01)
H04L 12/24 (2006.01)

(52) U.S. Cl.
CPC .......... H04L 67/16 (2013.01); H04L 61/2007 (2013.01)

(58) Field of Classification Search
CPC ...... H04L 67/16; H04L 61/2007; Y02D 30/30
See application file for complete search history.

(56) References Cited

U.S. PATENT DOCUMENTS

| | | | | |
|---|---|---|---|---|
| 2008/0137658 A1* | 6/2008 | Wang | .................. | H04L 12/4625 370/392 |
| 2014/0244810 A1* | 8/2014 | Chen | ................... | H04L 61/2076 709/221 |
| 2015/0256409 A1* | 9/2015 | Masuyama | ............. | H04L 41/12 370/254 |
| 2016/0234095 A1* | 8/2016 | Shetty | ..................... | H04L 45/02 |
| 2016/0315964 A1* | 10/2016 | Shetty | .................. | H04L 63/105 |
| 2018/0212951 A1* | 7/2018 | Goodrum | ............ | H04L 63/0428 |
| 2018/0212979 A1* | 7/2018 | Nakamura | .......... | H04L 63/1416 |

* cited by examiner

Primary Examiner — Abdulkader M Alriyashi
(74) Attorney, Agent, or Firm — ScienBiziP, P.C.

(57) ABSTRACT

A system to manage internet protocol address (IP) of baseboard management controller (BMC) includes switches, servers, and a management terminal. Each switch transmits to servers link layer discovery protocol in information packets, giving information of itself and a port of itself. Each server transmits obtained information of the switch and the port of the switch and a BMC IP of that server. The management terminal determines whether the BMC IP transmitted from each server is consistent with an assigning BMC IP corresponding to the port of the switch transmitted from the sever according to a relationship between each port of each switch, identification information of each server and assigning BMC IP of each server and displays the identification information of the server in the event that incorrect BMC IP is transmitted to enable a correction to be made. A method for managing BMC IP is also disclosed.

10 Claims, 3 Drawing Sheets

MANAGEMENT SYSTEM FOR INTERNET PROTOCOL ADDRESS OF BASEBOARD MANAGEMENT CONTROLLER, MANAGEMENT TERMINAL, AND MANAGEMENT METHOD

FIELD

The subject matter herein generally relates to baseboard management controllers internet protocol address management systems.

BACKGROUND

Baseboard management controllers of servers collect states of members, for example respective voltages, temperatures, and speeds of fans in the servers. A data center generally includes a number of servers. A management terminal connects to the servers of the data center to monitor the servers. The management terminal monitors the servers according to respective internet protocol addresses of the servers. When the address of the baseboard management controller internet protocol address (BMC IP) in the server is incorrectly set or is tampered with, the management terminal cannot mot monitor the server.

BRIEF DESCRIPTION OF THE DRAWINGS

Implementations of the present technology will now be described, by way of example only, with reference to the attached figures.

DETAILED DESCRIPTION

Figure 1:
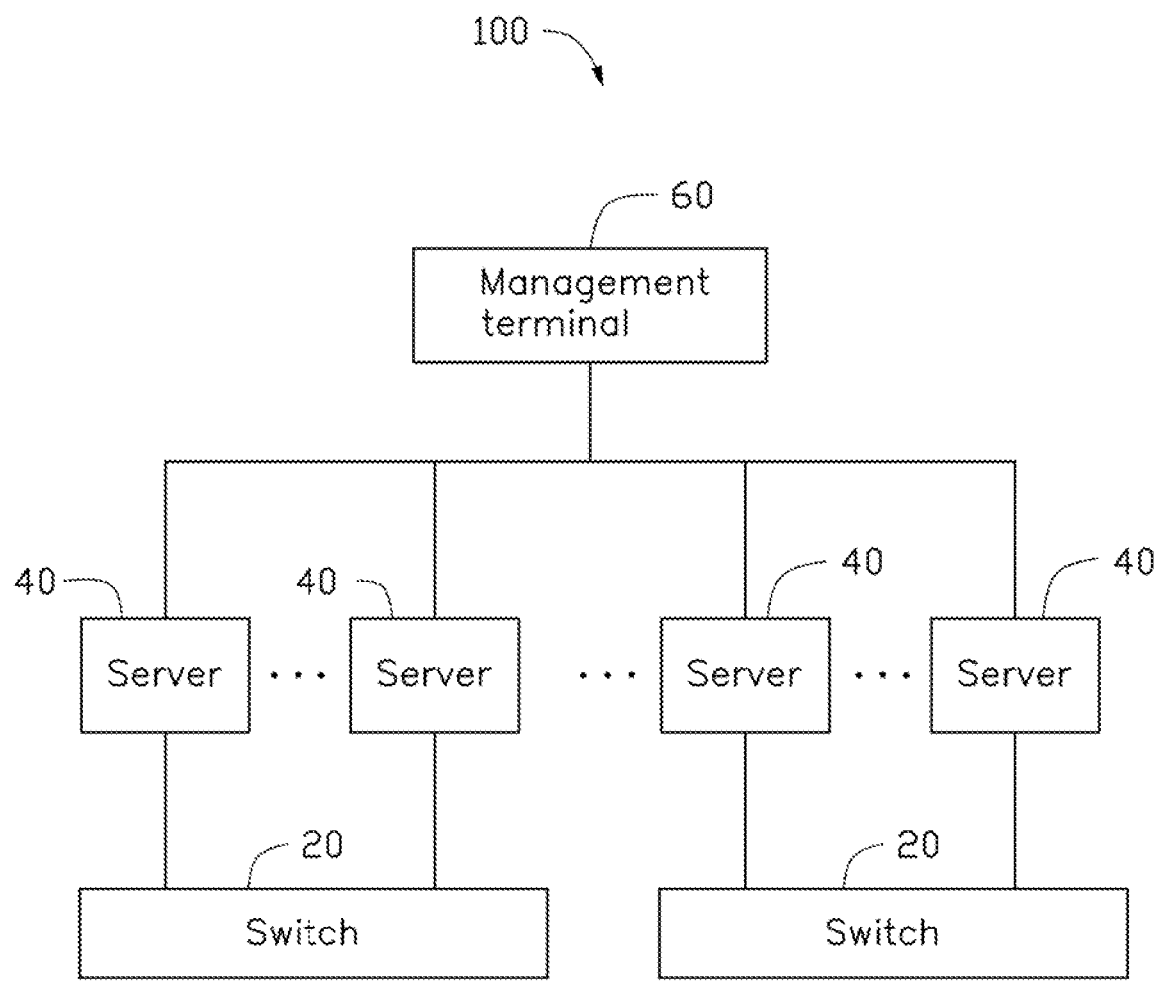
FIG. 1 is a schematic diagram of a baseboard management controller internet protocol address management system.
Figure 2:
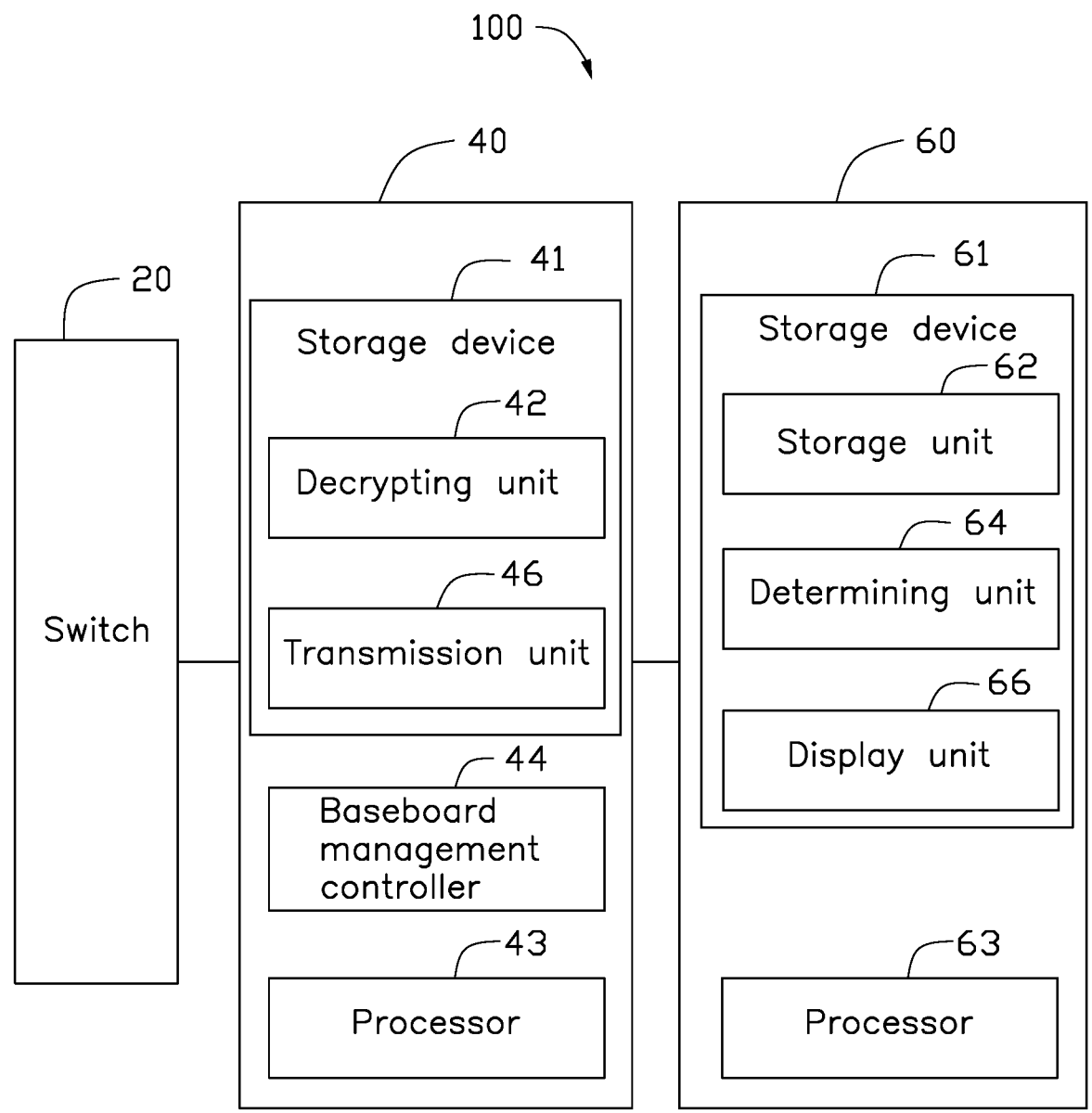
FIG. 2 is a block diagram of the baseboard management controller internet protocol address management system in FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series, and the like.

FIG. 1 illustrates a baseboard management controller internet protocol address management system 100. The baseboard management controller internet protocol address management system 100 includes at least one switch 20, a number of servers 40, and a management terminal 60. Each server 40 can connect to a port of a switch 20. The management terminal 60 can connect to all of the servers 40.

All of the switches 20 and all of the servers 40 support link layer discovery protocol (LLDP). The switch 20 transmits LLDP packages to the servers 40 connected to the at least one switch 20. Each LLDP package transmitted to the server includes port information of a port of the switch connected to the server and identification information of the switch 20. In an embodiment, the baseboard management controller internet protocol address management system 100 includes a number of switches 20. The identification information of the switch 20 includes a number or designation of the switch 20. The switches 20 have different numbers. The port information includes a number or designation of the port of the switch 20. Different ports of a switch 20 have different numbers.

The server 40 includes a storage device 41, a processor 43 and a baseboard management controller 44. The storage device 41 stores programs of a decrypting unit 42, and a transmission unit 46. The processor 43 calculates and processes various types of data of the programs in the storage device 41. The decrypting unit 42 decrypts the LLDP package to obtain the port information of the port of the switch 20 connected to the server and the identification information of the switch 20. The transmission unit 46 is configured to transmit to the management terminal 60 the port information of the port of the switch 20, identification information of the switch 20, and a BMC IP of the server 40 which has been obtained.

The management terminal 60 includes a storage device 61 and a processor 63 and a display unit 66. The storage device 61 stores programs of a storage unit 62 and a determining unit 64. The processor 63 calculates and processes various types of data of the programs in the storage device 61. The storage unit 62 stores a relationship between each port of each switch 20, identification information of each server 40, and assigning BMC IP of each server 40. The determining unit 64 determines whether the BMC IP transmitted from each server 40 is consistent with to the assigning BMC IP corresponding to the port of the switch 20. The display unit 66 displays the identification information of the server 40 if the BMC IP which is transmitted is not consistent with the assigning BMC IP corresponding to the port of the switch 20. The servers 40 are positioned in a data center. The identification information of the server 40 includes a position of the server 40 in the data center. Thus, a manager can know the position of the server 40 having incorrect BMC IP.

The information shown on the display unit 66 assists the manager to assign the server with correct baseboard management controller internet protocol address.

Figure 3:
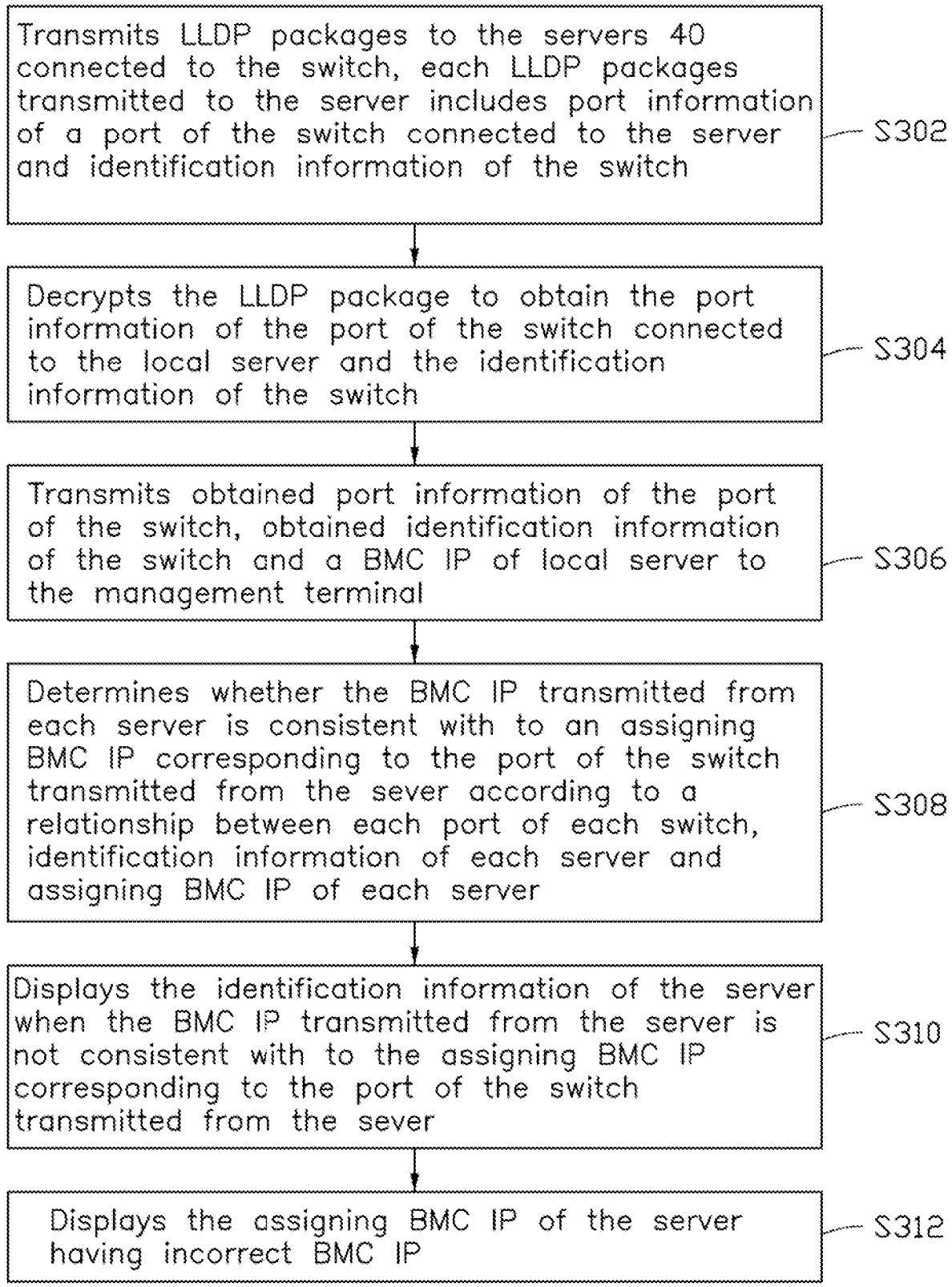
FIG. 3 is a flowchart of a baseboard management controller internet protocol address management method.

FIG. 3 illustrates a method for managing internet protocol address for baseboard management controller according to an embodiment. The order of blocks in FIG. 3 is illustrative only and the order of the blocks can change. Additional blocks can be added or fewer blocks may be utilized without departing from this disclosure. The exemplary method begins at block 302.

At block 302, the switch 20 transmits LLDP packages to the servers 40 connected to the switch 20. Each LLDP packages transmitted to the server includes port information of a port of the switch connected to the server and identification information of the switch 20.

At block 304, the decrypting unit 42 decrypts the LLDP package to obtain the port information of the port of the switch 20 connected to the local server and the identification information of the switch 20.

At block 306, the transmission unit 46 transmits obtained port information of the port of the switch 20, obtained identification information of the switch 20 and a BMC IP of local server 40 to the management terminal 60.

At block 308, the determining unit 64 determines whether the BMC IP transmitted from each server 40 is consistent with to an assigning BMC IP corresponding to the port of the switch 20 transmitted from the sever 40 according to a relationship between each port of each switch 20, identification information of each server 40 and assigning BMC IP of each server 40. The identification information of the server 40 includes a position of the server 40.

At block 310, the display unit 66 displays the identification information of the server 40 when the BMC IP transmitted from the server 40 is not consistent with to the assigning BMC IP corresponding to the port of the switch 20 transmitted from the sever.

At block 312, the display unit 66 displays the assigning BMC IP of the server 40 having incorrect BMC IP.

The embodiments shown and described above are only examples. Even though numerous characteristics and advantages of the present technology have been set forth in the foregoing description, together with details of the structure and function of the present disclosure, the disclosure is illustrative only, and changes may be made in the detail, comprising in matters of shape, size, and arrangement of the parts within the principles of the present disclosure, up to the full extent established by the broad general meaning of the terms used in the claims.

What is claimed is:

1. A baseboard management controller internet protocol address management system comprising:
   at least one switch;
   a plurality of servers, each server connected to a port of a switch of the at least one switch, wherein all of the at least one switch and the plurality of servers support link layer discovery protocol (LLDP), each switch transmits an LLDP package to corresponding server of the plurality of servers connected to the respective switch, each LLDP package transmitted to the corresponding server comprises port information of a port of the respective switch connecting to the corresponding server and identification information of the respective switch based on LLDP;
   each server comprising:
   a first storage device that stores one or more programs; and
   at least one first processor, wherein the one or more programs, when executed by the at least one first processor, cause the at least one first processor to:
      decrypt the LLDP package to obtain the port information of the port of the respective switch connecting to the corresponding server and the identification information of the respective switch; and
      transmit obtained port information of the port of the respective switch, obtained identification information of the respective switch and a baseboard management controller internet protocol address (BMC IP) of the corresponding server; and
   a management terminal comprising:
   a second storage device storing one or more programs and a predetermined relationship between each port of each switch, identification information of each server and BMC IP assignment of each server; and
   at least one second processor, wherein the one or more programs, when executed by the at least one second processor, cause the at least one second processor to
      determine whether the BMC IP transmitted from each server is consistent with the BMC IP assignment corresponding to the port of the respective switch transmitted from the corresponding server.

2. The baseboard management controller internet protocol address management system as claimed in claim 1, wherein the plurality of servers are positioned in a data center, the identification information of each server comprises a position of each server in the data center.

3. The baseboard management controller internet protocol address management system as claimed in claim 1, wherein the at least one second processor is further caused to display the identification information of the corresponding server which transmits a second BMC IP, the second BMC IP not consistent with the BMC IP assignment corresponding to the port of the respective switch transmitted from the corresponding server.

4. The baseboard management controller internet protocol address management system as claimed in claim 3, wherein the at least one second processor is further caused to display the BMC IP assignment of the corresponding server having incorrect BMC IP.

5. The baseboard management controller internet protocol address management system as claimed in claim 1, wherein the baseboard management controller internet protocol address management system comprises a plurality of switches.

6. The baseboard management controller internet protocol address management system as claimed in claim 5, wherein the identification information of the respective switch comprises a number of the respective switch, the at least one switch have different numbers, the port information comprises a plurality of ports of the respective switch, ports of each switch having different numbers.

7. A baseboard management controller internet protocol address management method comprising:
   switches transmit link layer discovery protocol (LLDP) packages to servers connected to the switches, each LLDP package transmitted to corresponding server comprises port information of a port of the connected switch connecting to the corresponding server and identification information of the connected switch based on LLDP;
   decrypting the LLDP packages to obtain the port information of the port of the connected switch connecting to the corresponding server and the identification information of the connected switch;
   transmitting obtained port information of the port of the connected switch, obtained identification information of the connected switch and a BMC IP of the corresponding server to a management terminal; and
   determining whether the BMC IP transmitted from each server is consistent with BMC IP assignment corresponding to the port of the connected switch transmitted from the corresponding server according to a predetermined relationship between each port of each switch, identification information of each server and BMC IP assignment of each server.

8. The baseboard management controller internet protocol address management method as claimed in claim 7, further comprising:
   displaying the identification information of the corresponding server which transmits the BMC IP being not consistent with the BMC IP assignment corresponding to the port of the connected switch transmitted from the corresponding server.

9. The baseboard management controller internet protocol address management method as claimed in claim 8, further comprising:
    displaying the BMC IP assignment of the corresponding server having incorrect BMC IP.

10. The baseboard management controller internet protocol address management method as claimed in claim 7, wherein the identification information of each server comprises a position of each server.

\* \* \* \* \*